United States Patent Office 3,743,513
Patented July 3, 1973

3,743,513
BLEND OF VACUUM AND REVERSE OSMOSIS FRUIT JUICE CONCENTRATES
Marshall P. Tulin, Bethesda, Md., assignor to Hydronautics, Incorporated, Laurel, Md.
No Drawing. Filed June 18, 1971, Ser. No. 154,638
Int. Cl. A23b 7/02; A23l 1/02
U.S. Cl. 99—105    12 Claims

ABSTRACT OF THE DISCLOSURE

A process for producing a fruit juice concentrate capable of speedy reconstitution by addition of water to make a cold drink having a substantial portion of the original aroma, flavor and palatability of fresh fruit juice comprising concentrating whole fruit juice under vacuum, and blending the vacuum concentrated juice with a concentrated fruit juice prepared by reverse osmosis to form a full flavored concentrate.

---

This invention relates to a process for preparing fruit juice concentrates of superior flavor, and is particularly directed to high density juice concentrates.

Fruit juice concentrates are usually prepared from fruit juices by evaporating water therefrom at atmospheric pressure or under vacuum. In addition, various fruit juice concentrates have been prepared by freezing and removing the water as ice from the concentrated juice.

It is well known that the delicate flavors of most fruit juices are easily injured by heat, especially in the presence of oxygen. It is also true, with most fruit juices, that the more they are concentrated, the less they resemble the natural product even when diluted water to original strength. This is due in a large part to the fact that the majority of the aroma of fruit juice consists of volatile flavoring compounds which are readily destroyed or volatilized by heat, even in vacuum. Thus, in the usual process of concentrating fruit juices by evaporation, most of these volatile flavoring compounds, generally referred to as "volatile esters" or "essence" are lost. The volatile flavoring compounds comprises various water soluble alcohols, esters, aldehydes and the like, which are quite volatile and generally go off to a large extent with the first 15 to 20% of the liquid removed in concentrating the juice by vacuum concentration.

Various attempts have been made to impart flavor to concentrated juices which have lost their essence. For example, in a number of prior processes the volatile esters are recovered and then returned to the finished concentrate.

Still other methods have been developed which add volatile esters to concentrated juice from other sources. Thus, the present standard commercial practice, as described in Pat. No. 2,453,109, MacDowell et al., comprises first running the density of fresh fruit juice (about 10°–15° Brix) up to 55°–75° Brix by vacuum concentration, and then diluting the so produced concentrate with single strength fresh juice to bring the density of the concentrate down to about 43° Brix, about a four fold concentrate. The addition of fresh fruit juice is necessary to restore the taste and flavor of the concentrate to a degree at which it is acceptable to the public, since original flavor is damaged by the vacuum evaporating process.

The industry has long wanted to market a more concentrated "Hibrix" juice, that is, up to about 55–60% solids. Hibrix concentrated juice would have many advantages over prior lower Brix concentrated juices. Thus, high concentrates can be packed in existing sized containers to enable the consumer to obtain more reconstituted juice from an equal volume of concentrated juice. On the other hand, less volume of Hibrix concentrated juice can be packaged in smaller containers to permit the consumer to obtain a volume of reconstituted juice equal to that obtainable from present concentrated juices. In either case, of course, a reduction would be realized in both the cost of packaging and shipping the concentrated juice based on the volume of reconstituted juice obtained by the consumer.

Further, a Hibrix juice could be packed in bulk in large cans or drums, and sold to canners who could then reduce it to 43° Brix and pack it for the retail trade. This procedure would be especially advantageous for export to foreign countries since it would result in big savings in freight costs.

Moreover, while the 43° Brix concentrate has to be stored at a temperature close to or below zero° F. the Hibrix concentrate of about 55–60% solids will stand higher storage temperatures as high as 20–30° F. without deterioration.

In the above described MacDowell et al. process, the juice has been concentrated initially up to 72° Brix, and any greater concentration by evaporation and/or reduction in the added whole juice would result in a juice of lower taste quality.

Another prior art technique involves first preparing an initial concentrate from fresh juice by evaporation under vacuum to produce a concentrate of 55°–60° Brix. To impart flavoring to the juice, this concentrate is then passed along one side of a permeable membrane, while fresh juice is passed on the other side of the membrane so that the difference in osmotic pressure transfers the essence of the fresh juice to the concentrated juice, thus restoring some of its flavor qualities while maintaining its concentration. The fresh juice is then passed to the concentrator and cycled back along the other sde of the membrane to produce a continuous process.

Still other process have relied solely on reverse osmosis to concentrate fresh juice to produce a fresh juice concentrate. Reverse osmosis processes in principle can be used to concentrate juice beyond 43% solids. However, it is a more expensive process than evaporation and as the concentration increases, the cost of further concentration by reverse osmosis increases very rapidly. The cost of reverse osmosis processes therefore has effectively limited it to the production of concentrates of no more than about 45° Brix.

Accordingly, it is an object of this invention to provide a simple and more effective method for imparting to concentrated juice the flavor which is inherent in fresh juice but which is removed during concentration.

Another object is to provide such a method in which the results are achieved easily and simply, and with simple, easy to operate equipment.

Addition objects and advantages of the invention will be set forth in part in the description which follows, and in part will be obvious from the description, or may be learned by practice of the invention. The objects and advantages are attained by means of the processes, methods and combinations particularly pointed out in the appended claims.

To achieve the foregoing objects and in accordance with its purpose, as embodied and broadly described, the present invention provides a process of producing a fruit juice concentrate capable of speedy reconstitution by addition of water to make a cold drink having a substantial portion of the original aroma, flavor and palatability of the fruit comprising concentrating whole fruit juice under vacuum and blending the vacuum concentrated juice with a concentrated fruit juice prepared by reverse osmosis to form a full flavored concentrate.

The fruit juice is preferably a citrus juice and more preferably is orange juice. The vacuum concentrated juice is preferably concentrated to between about 60° to 72° Brix, and blended with a reverse osmosis concentrate of about 20° to 45° Brix. The vacuum concentrated juice is blended with from 30 to 60% by volume of reverse osmosis concentrate based on the volume of the final concentrate to yield a final concentrate of about 55°–60° Brix.

It is to be understood that both the foregoing general description and the following detailed description are exemplary and explanatory, but are not restrictive of the invention.

In accordance with the invention, the first step of the process for preparing a Hibrix concentrated juice comprises concentrating whole juice of fruit under vacuum. The concentration by vacuum is effected in the usual vacuum concentration equipment in which the water is removed by applying vacuum to fresh juice in a suitable closed container. The concentrated juice thus obtained is generally quite free from the essence or flavoring compounds which, as pointed out above, generally comprise water-soluble alcohols, aldehydes and the like. At present most vacuum concentrations of juices are designed to produce a product having a concentration of from about 65°–75° Brix.

Juices that can be concentrated by the present invention include apple juice, grape juice, orange juice, tomato juice, tangerine juice, and other citrus juices. Apply juice and orange juice encompass a wide spectrum of chemical and physical characteristics of fruit juices and thus illustrate the applicability of the present invention to a wide variety of juices.

In accordance with the invention, the concentrated fruit juice produced by vacuum concentration is blended with a concentrated juice prepared by reverse osmosis to produce a full flavored concentrate. The reverse osmosis concentrated juice can be prepared by any of the commonly used reverse osmosis techniques for juice concentrations. For example, the reverse osmosis methods of juice concentration described by Merson et al. "Juice Concentration by Reverse Osmosis," Food Technology, vol. 22, pages 97–100 (1968) can be applied to concentrate the fruit juices used in the present invention. Other reverse osmosis techniques, such as those described in Patent No. 3,228,877 to H. I. Mahon, issued Jan. 11, 1966; or in copending U.S. application Ser. No. 864,309, entitled "Method and Apparatus for the Concentration of Solutions" and filed Oct. 7, 1969 and assigned to the same assignees as the present application can also be used in the practice of the present invention. The teachings of these references are incorporated in this application to describe reverse osmosis methods that can be employed in the present invention. It is to be understood, however, that the present invention is not limited to the methods described in these references and that other reverse osmosis techniques can be utilized in the practice of the present invention.

In accordance with the invention, single strength fresh juice is concentrated by a reverse osmosis technique to a concentration of from about 20°–45° Brix. The fresh fruit juice for preparing the reverse osmosis concentrate can be from the same batch of juice used to prepare the vacuum concentrate, or can be from a different batch. Fruit juice concentrates prepared by reverse osmosis retain their volatile flavor compounds.

The concentrated fruit juice prepared by reverse osmosis is then blended with the concentrated juice prepared by vacuum evaporation and from which all of the flavor essences essentially have been removed. The blending of the vacuum concentrated juice with the reverse osmosis produced juice is accomplished in any suitable blending apparatus such as a Waring blender. The reverse osmosis concentrate imparts its volatile flavoring compounds to the final blended concentrate of the present invention.

In accordance with the present invention about 30 to 60% by volume of reverse osmosis produced concentrated juice is blended with from about 70 to 40% by volume of the vacuum concentrated juice, based on the volume of the final concentrate. Preferably, the concentrates are mixed to provide a final concentrate having a density of between about 55°–60° Brix. For example, when mixing a juice evaporated to a concentration of about 72° Brix with an equal volume proportion of a juice concentrated to 45° Brix by reverse osmosis, a blend is produced having a concentration of about 58° Brix.

The concentrates of the present invention have a density higher than those obtained by the prior art processes of mixing single strength fresh juice with a vacuum concentrated juice, yet retain all of the flavor properties of such concentrates. Thus, the blends of the present invention, upon reconstituting with water, produce a product having a taste quality substantially similar to fresh juice.

As more fully set forth in the specific examples below, it is to be appreciated that the more preferable, lower reverse osmosis concentrates, i.e. from about 20° to 30° Brix, can be used in the present invention with the conventional, higher vacuum concentrates to still produce a Hibrix, full flavored concentrate. This is a particularly advantageous feature of the present invention because of the savings in production costs that are realized by using the lower reverse osmosis concentrates. Of course, the higher reverse osmosis concentrates can be used with less and/or lower concentrations of vacuum concentrate to produce the Hibrix concentrate without departing from the scope of this invention.

The following examples are given by way of illustration and further explain the principles of the invention. The examples are merely illustrative and are not to be understood as limiting the scope and underlying principles of the invention in any way. All percentages referred to herein are by volume unless otherwise specifically indicated.

EXAMPLE 1

Valencia oranges are washed, allowed to dry and halved. The juice is then extracted and screened of suspended pulp.

A portion of the fresh juice having a concentration of about 12° Brix is concentrated under vacuum and at a temperature of about 40° F. to about 72° Brix.

The remaining portion of juice is concentrated by reverse osmosis to about 45° Brix.

The reverse osmosis produced concentrate is blended with the vacuum concentrated juice in equal proportions to obtain a final concentrate of about 58° Brix. The product is then sealed under vacuum, and placed in cold or frozen storage.

EXAMPLE 2

The process of Example 1 is repeated except that about 60% of the reverse osmosis concentrate is blended with about 40% of the vacuum concentrated juice to produce a final concentrate of about 56° Brix.

EXAMPLE 3

The process of Example 1 is repeated except that the juice concentrated by reverse osmosis is concentrated to about 20° Brix.

About 30% of the 20° Brix reverse osmosis concentrate is then blended with about 70% of vacuum concentrated juice to produce a final concentrate of about 56° Brix.

EXAMPLE 4

The process of Example 3 is repeated except that the juice concentrated by reverse osmosis is concentrated to about 30° Brix. Using the same relative amounts of each concentrate, the final concentrate is about 59° Brix.

EXAMPLE 5

The process of Example 1 is repeated except that the juice concentrated by vacuum concentration is concentrated to about 60° Brix.

About 30% of the reverse osmosis concentrate is then blended with about 70% of the 60° Brix vacuum concentrated juice to produce a final concentrate of about 55° Brix.

The invention in its broader aspects is not limited to the specific details shown and described and departures may be made from such details without departing from the principles of the invention and without sacrificing its chief advantages.

What is claimed is:

1. A process for producing a high Brix fruit juice concentrate capable of speedy reconstitution by addition of water to make a cold drink having a substantial portion of the original aroma, flavor and palatability of fresh fruit juice comprising
  (a) concentrating whole fruit juice under vacuum to a high degree of concentration, and
  (b) blending the vacuum concentrated juice with a concentrated fruit juice prepared by reverse osmosis to dilute the vacuum concentrated juice to form a full flavored high Brix concentrate.

2. The process of claim 1 wherein the fruit juice is a citrus juice.

3. The process of claim 2 wherein the fruit juice is orange juice.

4. The process of claim 1 wherein the vacuum concentrated fruit juice is concentrated to a density of from about 60° to 72° Brix.

5. The process of claim 1 wherein the reverse osmosis concentrated fruit juice is concentrated to a density of from about 20° to 45° Brix.

6. The process of claim 5 wherein the reverse osmosis concentrated fruit juice is concentrated to a density of from about 20° to 30° Brix.

7. The process of claim 1 wherein the full flavored concentrate has a density of between about 55° to 60° Brix.

8. The process of claim 1 wherein from about 30 to 60% by volume of reverse osmosis concentrate based on the volume of the full flavored concentrate is blended with from about 70 to 40% of the vacuum concentrate based on the value of the full flavored concentrate.

9. The process of claim 1 wherein the fruit juice is orange juice, the vacuum concentrated juice is concentrated to a density of between about 60° to 72° Brix, and the reverse osmosis concentrated juice is concentrated to a density of 20° to 45° Brix.

10. The process of claim 9 wherein the vacuum concentrated juice and reverse osmosis concentrated juice are blended together to produce a full flavored juice concentrate having a density of about 55° to 60° Brix.

11. The process of claim 1 wherein the full flavored concentrate has a concentration of at least about 55° Brix.

12. The process of claim 1 wherein the vacuum concentrated juice is concentrated to a density of between about 60° to 72° Brix, the reverse osmosis concentrated juice is concentrated to a density of 20° to 45° Brix, and the vacuum concentrated juice and reverse osmosis concentrated juice are blended together to produce a full flavored juice concentrate having a density of about 55° to 60° Brix.

References Cited

UNITED STATES PATENTS

| Patent No. | Date | Inventor | Class |
|---|---|---|---|
| 2,453,109 | 11/1948 | MacDowell et al. | 99—205 |
| 2,967,778 | 1/1961 | Cole et al. | 99—205 |
| 3,044,887 | 7/1962 | Smith et al. | 99—205 |
| 3,053,668 | 9/1962 | Lund | 99—105 X |
| 3,127,276 | 3/1964 | Brent et al. | 99—105 X |
| 3,301,685 | 1/1967 | Harwell | 99—205 X |
| 3,423,310 | 1/1969 | Popper | 210—23 |

OTHER REFERENCES

R. L. Merson et al.: "Juice Concentration By Reverse Osmosis," Food Technology, vol. 22, May 1968, pp. 97–100.

NORMAN YUDKOFF, Primary Examiner

K. P. VAN WYCK, Assistant Examiner

U.S. Cl. X.R.

99—205

UNITED STATES PATENT OFFICE
CERTIFICATE OF CORRECTION

Patent No. 3,743,513     Dated July 3, 1973

Inventor(s)  MARSHALL P. TULIN

It is certified that error appears in the above-identified patent and that said Letters Patent are hereby corrected as shown below:

Claim 8, column 6, line 3, change "value" to --volume--.

Signed and sealed this 2nd day of April 1974.

(SEAL)
Attest:

EDWARD M. FLETCHER, JR.
Attesting Officer

C. MARSHALL DANN
Commissioner of Patents